United States Patent
Atar et al.

Patent Number: 5,712,943
Date of Patent: Jan. 27, 1998

[54] OPTICAL FIBER DISPENSER

[75] Inventors: Shaul Atar, Afula; Ehud Dekel, Nofit; Nathan Raz, Haifa, all of Israel

[73] Assignee: The State of Israel, Ministry of Defence, Rafael Armament Development Authority, Tel-Aviv, Israel

[21] Appl. No.: 685,713

[22] Filed: Jul. 24, 1996

Related U.S. Application Data

[63] Continuation of Ser. No. 547,373, Oct. 24, 1995, abandoned, which is a continuation of Ser. No. 193,718, Feb. 9, 1994, abandoned.

[30] Foreign Application Priority Data

Feb. 24, 1993 [IL] Israel ..................... 104839

[51] Int. Cl.$^6$ ..................... G02B 6/22
[52] U.S. Cl. ............ 385/134; 385/147; 385/126; 156/169; 156/172
[58] Field of Search ............ 244/3.12; 156/172, 156/166, 167, 169, 156; 385/134, 115, 147, 126, 123

[56] References Cited

U.S. PATENT DOCUMENTS

| | | | |
|---|---|---|---|
| 3,211,540 | 10/1965 | Cole | 385/123 |
| 3,320,114 | 5/1967 | Schulz | 385/123 |
| 4,995,698 | 2/1991 | Myers | 350/96.29 |
| 5,064,490 | 11/1991 | Chapin et al. | 156/172 |
| 5,161,208 | 11/1992 | Christie et al. | 385/128 |
| 5,245,687 | 9/1993 | Usui | 385/134 |
| 5,256,237 | 10/1993 | Maas et al. | 156/156 |
| 5,594,829 | 1/1997 | LoStraco et al. | 385/134 |
| 5,607,532 | 3/1997 | LoStraco | 156/169 |

FOREIGN PATENT DOCUMENTS

| | | | |
|---|---|---|---|
| 0391557 | 10/1990 | European Pat. Off. | |
| 9005928 | 5/1990 | WIPO | 385/134 |
| 9007464 | 7/1990 | WIPO | |
| 9010244 | 9/1990 | WIPO | 385/134 |

*Primary Examiner*—John Ngo
*Attorney, Agent, or Firm*—Steinberg, Raskin & Davidson, P.C.

[57] ABSTRACT

An optical fiber dispenser for the payout of optical fiber from a moving vehicle so as to maintain a wire communication link with a control station. The dispenser has a bobbin carrying a multi-layer optical fiber pack and holding heating means connectable to a power or heat supply.

14 Claims, 3 Drawing Sheets

OPTICAL FIBER DISPENSER

This application is a continuation of U.S. patent application Ser. No. 08/547,373 filed Oct. 24, 1995 (now abandoned) which in turn is a continuation of U.S. patent application Ser. No. 08/193,718 filed Feb. 9, 1994 (now abandoned).

FIELD OF THE INVENTION

The present invention is in the field of optical fibers and concerns specifically a so-called optical fiber dispenser which consists of a cylindrical or tapered bobbin bearing an optical fiber pack in form of a spool.

BACKGROUND OF THE INVENTION AND PRIOR ART

Optical fiber dispensers are used for communication between a launcher and a remotely operated object or vehicle such as a remotely operated observation aircraft or a vehicle, which carries the dispenser and from which the dispenser pays out the optical fiber. For proper, smooth and faultless functioning of the payout, it is necessary that throughout the payout operation the residual pack, i.e. that part of the optical fiber spool that is still on the bobbin, must not loosen so that each turn of fiber remains in place in its original, slightly tensioned state until payout.

An optical fiber is made of at least two different materials, a fused silica inner part which guides the light and an elastomer coating. During winding of the optical fiber on the bobbin an adhesive is applied between the layers of the pack and between the bottom layer and the bobbin. In this way the individual turns of fiber in the pack are fixed so as to ensure that no loosening occurs prior to payout. However, experience has shown that where a dispenser is exposed to extreme temperatures due to different climatic conditions, the winding turns become loose upon cooling, due to the different coefficients of thermal expansion of the bobbin on the one hand and the fiber on the other hand which results in different rates of shrinking.

In an attempt to overcome this problem, it has been proposed in accordance with U.S. Pat. No. 4,995,698 to manufacture optical fiber dispensers with bobbins made of an orthotrophic composite material such that the coefficient of circumferential thermal expansion of the bobbin matches the coefficient of longitudinal thermal expansion of the optical fiber and the axial coefficient of thermal expansion of the bobbin matches the coefficient of lateral thermal expansion of the optical fiber. It was suggested that in this way the problem of loosening of the individual turns in the fiber pack would be overcome. In practice, it was, however, difficult to find a suitable orthotrophic material for implementing the teachings of the said U.S. patent. Moreover, the arrangement according to U.S. Pat. No. 4,995,698 is inadequate for compensation of changes in the radial distance between the wound layers of the pack, which changes are due to lateral thermal expansion of the fiber and which cause loosening of the upper layers at low temperatures even when the bobbin is precisely adjusted to the fiber.

It has therefore become necessary to look for different solutions and it is the object of the present invention to provide such a solution.

SUMMARY OF THE INVENTION

The invention is based on the novel idea that the above-mentioned problems resulting from different thermal expansion coefficients and consequential differential shrinking upon cooling, may be overcome if the dispenser is kept between temperature limits at which contraction or expansion of the bobbin and the optical fiber are limited to acceptable values.

In accordance with the present invention there is provided an optical fiber dispenser adapted for the payout of optical fiber from a moving vehicle so as to maintain a wire communication link between said moving vehicle and a control station, which dispenser is of the kind that comprises a bobbin carrying a multi-layer optical fiber pack in which the individual layers are held in place by an adhesive, characterized by said bobbin comprises heating means connectable to a power or heat supply.

In accordance with one embodiment of the invention the said heating means are electric. If desired such electric heating means may be associated with a temperature control assembly comprising sensor means and an electric circuit breaker associated therewith.

In accordance with another embodiment of the invention said heating means is an indirect heat exchanger fed with a heat donor gaseous or liquid fluid.

In accordance with one modification of the embodiment with electric heating means in the bobbin, said heating means are connected prior to launching to an electric power supply of the control station. In operation of such an embodiment the bobbin is heated in the manner specified while the vehicle is still located at the said control station, e.g. on a launcher in case of an airborne vehicle. Once the vehicle is launched the electric heating means within the bobbin are disconnected from the power supply of the control station.

In cases in which the pre-heating of the bobbin achieved in this way is sufficient to avoid any loosening of the optical fiber windings, no further electric power supply to the said electric heating means is required after launching.

There are cases where the pre-heating of the bobbin is insufficient and further heating during flight is required. Therefore, in accordance with another embodiment of the invention the said moving vehicle has a switching device which upon disconnection of the electric heating means within the bobbin from the electric power supply of the launcher, connects said electric heating means to a power supply within the launched vehicle.

In accordance with yet another embodiment of the invention heating means of the bobbin are permanently connected to a power or heat supply within the vehicle.

The invention also provides a remotely operated vehicle, e.g. an airborne vehicle such as an observation aircraft, fitted with an optical fiber dispenser of the kind specified.

DESCRIPTION OF THE DRAWINGS

For better understanding the invention will now be described, by way of example only, with reference to the annexed drawings which are not to scale and in which.

SPECIFIC DESCRIPTION OF A PRIOR ART DISPENSER

Figure 1:
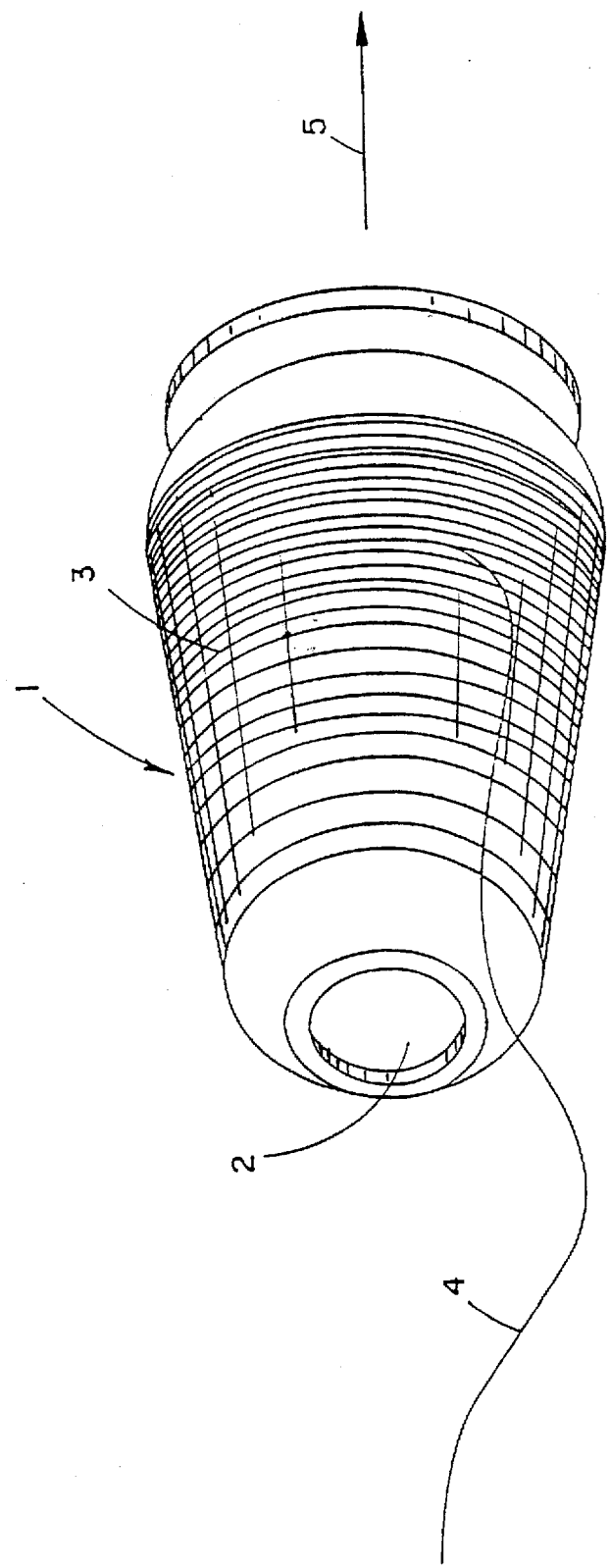
FIG. 1 is an isometric view of a prior art optical fiber spool during payout.

Attention is directed to FIG. 1 which shows a prior art;. dispenser during payout. The dispenser 1 comprises a tapered bobbin 2 bearing an optical fiber pack 3. A first end of the optical fiber is linked through fiber stretch 4 to a control station in such a way that the optical fiber is paid out in direction of the small diameter end of bobbin 2, and a second end thereof is linked to the electronics (not shown) of the moving vehicle on which dispenser 1 is mounted.

The optical fiber pack 3 consists of a multi-layer spool with an adhesive material applied between individual layers of wound optical fiber, as well as between the bottom layer and bobbin 2, and in this way all individual winding turns are meant to remain in place in the original, slightly tensioned state until paid out when the dispenser 1 with the vehicle on which it is mounted, moves away from the ground control station, e.g. a launcher, in the direction of arrow 5 whereby fiber 4 is paid out. As explained hereinbefore, when the vehicle is subjected to extreme temperature variations, say between +70° C. and −40° C., as may happen in case of a flying vehicle, the winding of the optical fiber pack might become loose.

DETAILED DESCRIPTION OF SPECIFIC EMBODIMENTS OF THE INVENTION

Figure 2:
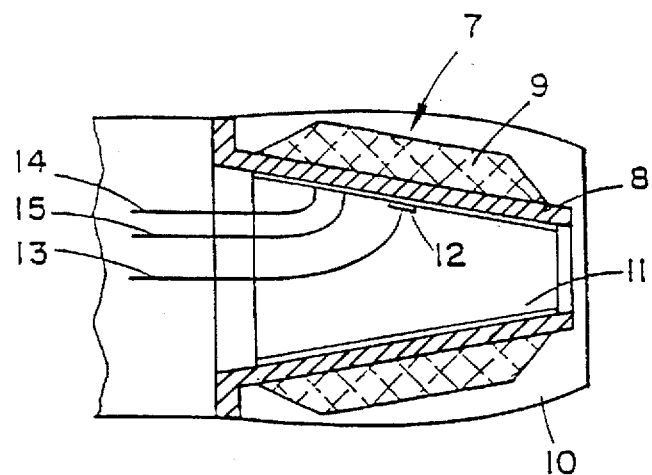
FIG. 2 is a schematic cross-section of an optical fiber dispenser according to the invention.

Attention is now directed to FIG. 2 which is a schematic cross-section of one specific embodiment of an optical fiber dispenser according to the invention. As shown, dispenser 7 comprises a bobbin 8 bearing a pack of optical fiber 9. Dispenser 7 is enclosed within a casing 10.

The inner face 8b bobbin body 8a is lined with the electric resistor foil 11 e.g. of the Thermofoil™ type produced by Minco Products Inc. of Minneapolis, U.S.A. Resistor foil 11 is associated with a temperature sensor 12 linked by means of a pair of wires 13 to a circuit breaker (not shown in FIG. 2), and is linked by means of electric wires 14 and 15 to an electric power supply.

Figure 3:
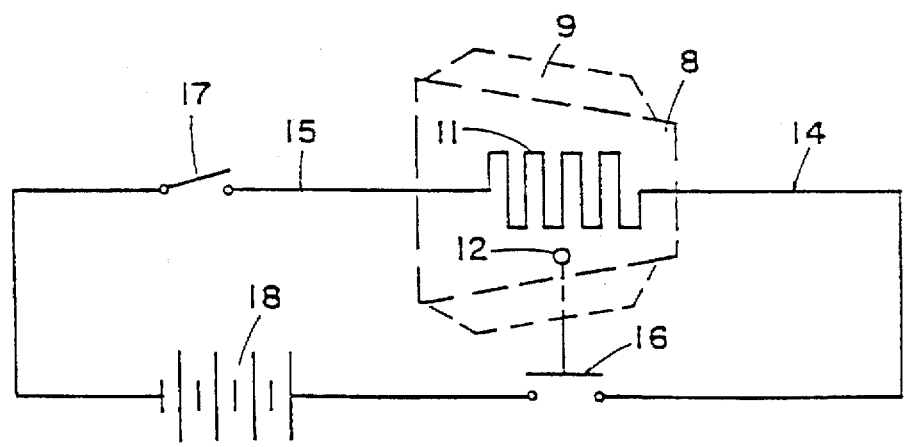
FIG. 3 is a wiring diagram of the dispenser of FIG. 2.

Attention is now directed to FIG. 3 which is a wiring diagram of the dispenser according to the invention shown in FIG. 2. As shown, the temperature sensor 12 associated with the electrical resistor 11 is associated with a circuit breaker 16 inserted in wire 14, and a manually operable switch 17 is inserted in wire 15. Wires 14 and 15 lead to an electric power supply 18, e.g. a 12V battery of the kind available in automotive land vehicles.

In case of use of dispenser 7 in an airborne vehicle, at the start of operation sensor 12 is adjusted to maintain the temperature of the resistor 11 at a desired level, say 20° C., and the resistor is preheated to such desired temperature prior to launching. In this way there is no loosening of the optical fiber turns in consequence of temperature changes in the course of the flight until an individual turn is unwound in consequence of payout.

Figure 4:
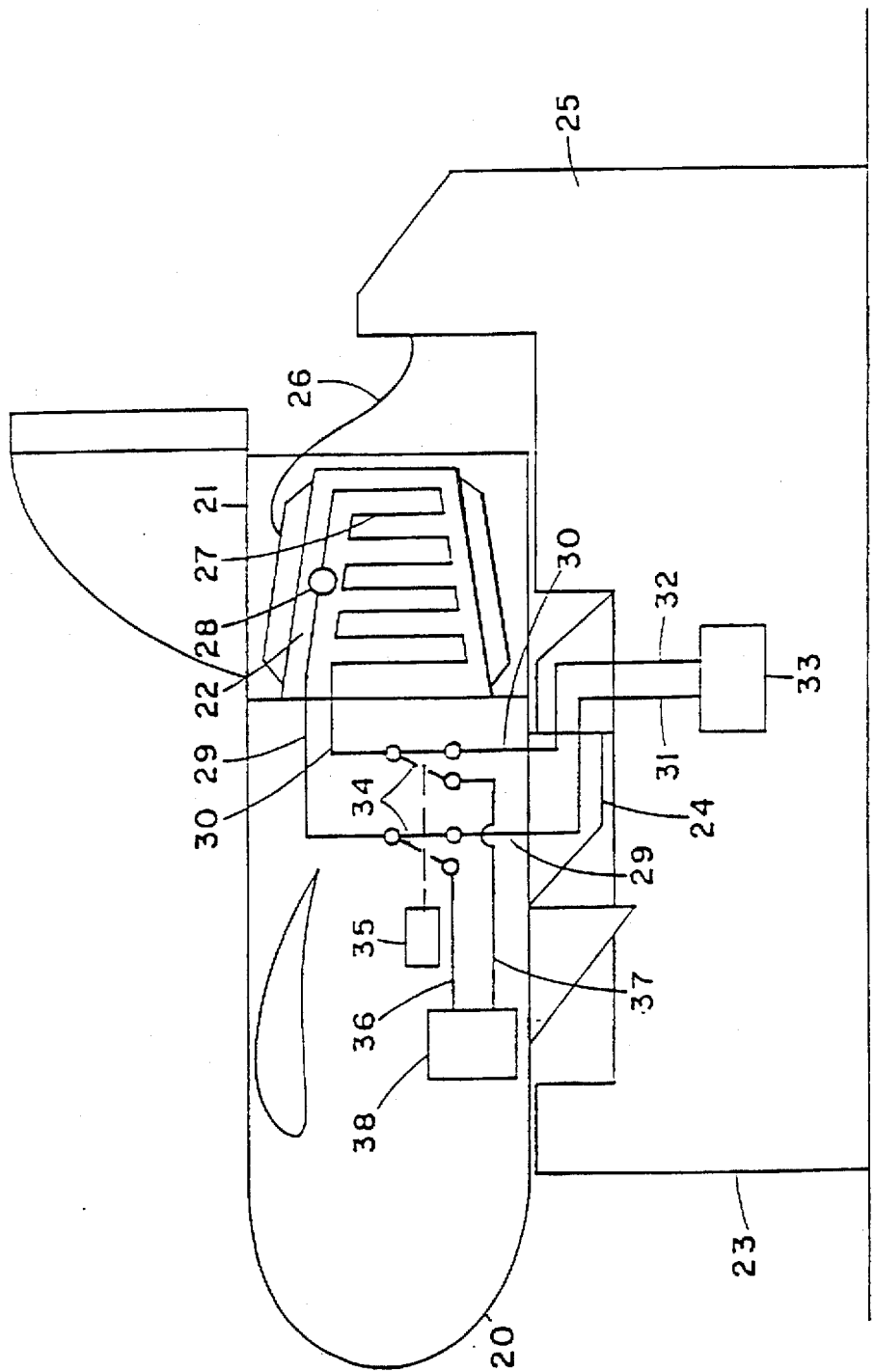
FIG. 4 is a schematic cross-section of an airborne vehicle placed within a launcher and fitted with an optical fiber dispenser according to the invention with another embodiment of wiring.

During preheating of the spool prior to launching the electric heating means within the bobbin of the dispenser are linked to a power supply of the launcher by connector means which are disconnected upon launching, e.g. by the so-called umbilical connector. If desired, switching means may be provided within the airborne vehicle, which upon launching are shifted whereby the said electric heating means are connected to an electric power supply within the vehicle. Such an embodiment is shown in FIG. 4.

As shown there, an airborne vehicle 20 fitted with an optical fiber dispenser 21 having a bobbin 22 bearing an optical fiber spool is placed on a launcher 23 fitted with an umbilical connector 24 by which various pre-launch electric connections are established between the launcher and the vehicle. The end portion of the optical fiber 26 is connected to end 25 of launcher 23.

As in the embodiment of FIGS. 2 and 3, bobbin 22 is fitted with electric heating means 27 with an associated temperature sensor 28 and a circuit breaker and a manually operable switch similar to, respectively, circuit breaker 16 and switch 17 in FIG. 3 and which are not shown here.

Wires 29 and 30 in vehicle 20 which bear a two-way switch 34 associated with a switching device 35 connect via the umbilical connector 24 to wires 31 and 32 of the launcher which lead to a power supply 33. Wires 36, 37 lead to a power supply 38 inside the vehicle.

Before launching, bobbin 22 is preheated with electric power from power supply 33 similar as in FIG. 3. Upon launching, when the umbilical connector 24 is disconnected from vehicle 20, the switching device 35 automatically shifts switch 34 into the position shown in dashed lines whereby the heating means 27 are connected to the power source 38 of the vehicle.

By way of example, a dispenser comprising a 200 mm long aluminum bobbin having an outside diameter of 130 mm, wound with a 14,000 m long telecommunication quality single mode optical fiber in 50 layers would take less than 1.5 hours to warm from −40° C. to +20° C. using a 5Ω Thermofoil™ heater connected to a 12V battery.

We claim:

1. In an optical fiber dispenser adapted for the payout of optical fiber from a moving vehicle so as to maintain a wire communication link between said moving vehicle and a control station, which dispenser comprises a bobbin carrying a multi-layer optical fiber pack in which the individual layers are held in place by an adhesive, the improvement comprising said bobbin comprising a bobbin body and heating means connectable to a power or heat supply for heating said bobbin body.

2. A dispenser according to claim 1, further comprising said heating means are electric.

3. A dispenser according to claim 2, wherein the electric heating means are associated with a temperature control assembly comprising sensor means and an electric circuit breaker.

4. A dispenser according to claim 1, wherein the bobbin body is hollow and a foil type electric resistor is applied to the inner wall side of the bobbin body.

5. A dispenser according to claim 1, wherein said heating means is an indirect heat exchanger fed with a heat donor gaseous or liquid fluid.

6. A remotely operated vehicle fitted with a dispenser according to claim 1.

7. A vehicle according to claim 6 being a remotely operated airborne vehicle.

8. A vehicle according to claim 6, comprising means for connecting the said heating means to a power or heat supply of a launcher.

9. A vehicle according to claim 6, comprising switching means for automatically connecting said electric heating means to a power supply within the vehicle, when the vehicle leaves the launcher.

10. A vehicle according to claim 6, wherein the said heating means are permanently connected to a power supply within the vehicle.

11. A dispenser according to claim 1, further comprising temperature regulating means for regulating said heating means to heat said bobbin body to a specific temperature.

12. A dispenser according to claim 1, wherein said multi-layer optical fiber pack is releasably coupled to said bobbin body.

13. An optical fiber dispenser adapted for the payout of optical fiber from a moving vehicle so as to maintain a wire communication link between said moving vehicle and a control station, comprising a bobbin comprising a bobbin body and heating means connectable to a power or heat supply for heating said bobbin body; and a multi-layer optical fiber pack coupled to said bobbin body and including adhesive material, and optical fibers situated in multiple layers releasably held in place on said bobbin body by said adhesive.

14. A remotely operated vehicle, comprising a vehicle body, an optical fiber dispenser situated in said vehicle body, said optical fiber dispenser comprising a multi-layer optical fiber pack in which individual layers of optical fibers are held in place on a bobbin by an adhesive, said bobbin comprising a bobbin body and heating means connectable to a power or heat supply for heating said bobbin body, said dispenser being adapted to payout said optical fibers from said multi-layer optical fiber pack upon movement of said vehicle body so as to maintain a wire communication link between said vehicle body and a control station.

* * * * *